Nov. 1, 1932. E. CARLSON 1,886,327
SAFETY MOTOR FOR AIRCRAFT
Filed March 14, 1932 2 Sheets-Sheet 2

Inventor
E. Carlson,
By Clarence A O'Brien
Attorney

Patented Nov. 1, 1932

1,886,327

UNITED STATES PATENT OFFICE

EDWARD CARLSON, OF TOMBSTONE, ARIZONA

SAFETY MOTOR FOR AIRCRAFT

Application filed March 14, 1932. Serial No. 598,811.

This invention relates to safety motors for aircraft, the general object of the invention being to provide an air-driven motor having a clutch connection with the engine-driven propeller shaft with supply tanks for furnishing air to the motor and manually controlled means for releasing the clutch and for permitting the air to pass from the tank to the air motor to operate the same, whereby the air motor can be used to provide a safe landing of the craft if anything should happen to the gas motor.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
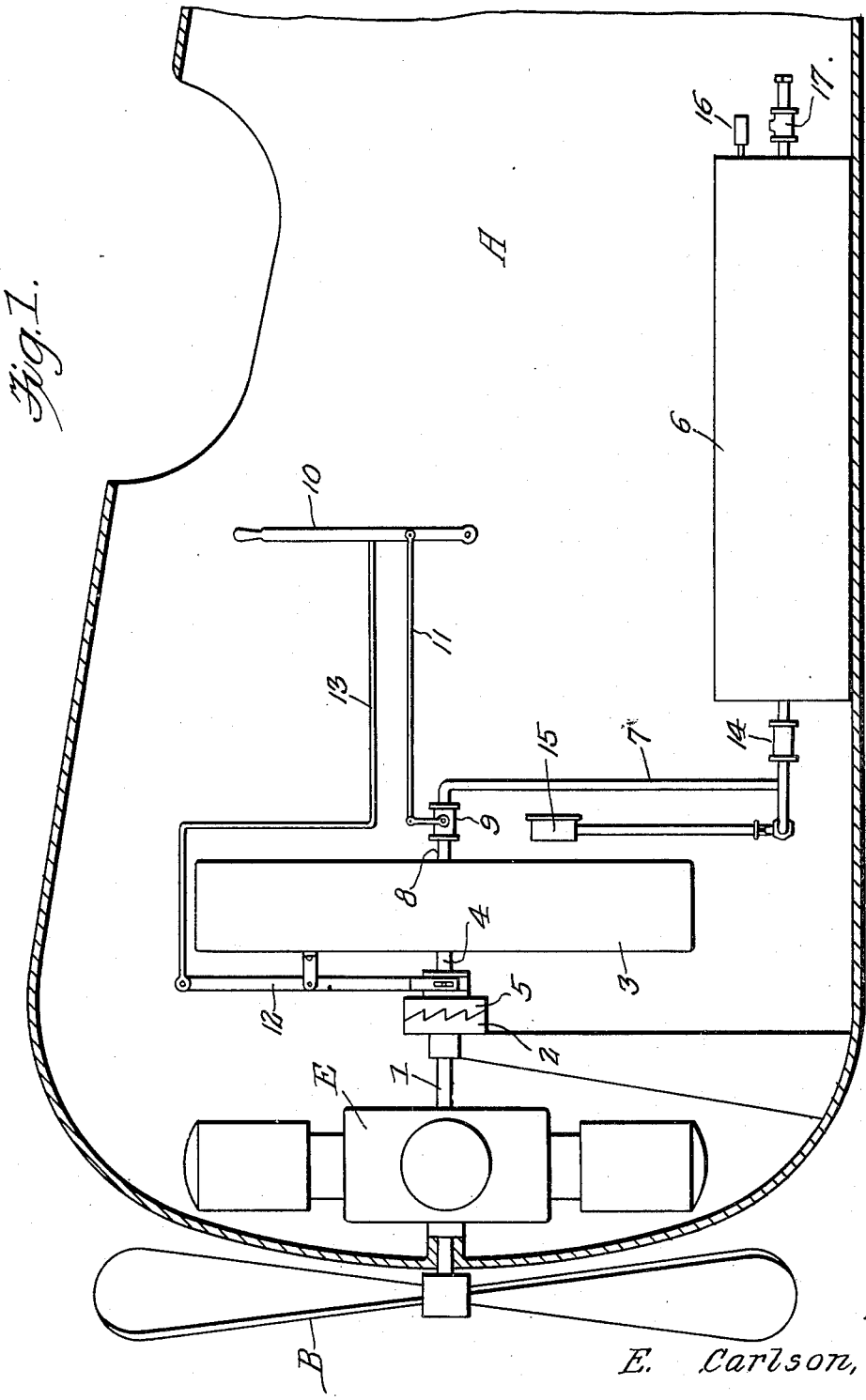
Figure 1 is a sectional view through the front part of the fuselage of an aircraft showing the invention in use.
Figure 2:
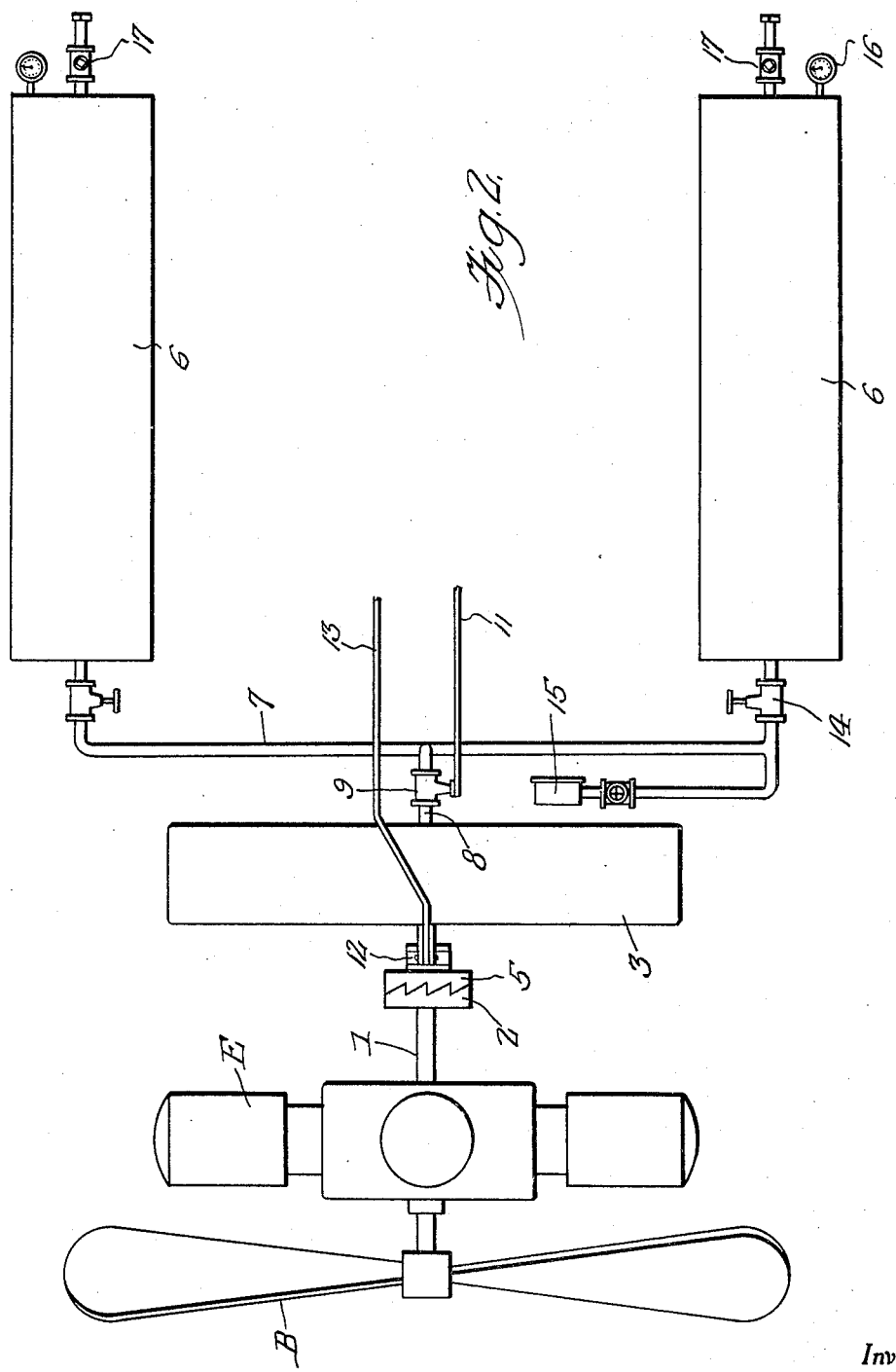
Fig. 2 is a plan view showing the invention attached to the crank shaft of a motor used for driving the propeller.

In these drawings, the letter A indicates a part of the fuselage of an aircraft and the letter B the propeller which is connected to the crank shaft of a gas motor shown generally at E. This shaft has an extension 1 extending rearwardly therefrom, with the clutch part 2 attached to the rear extremity thereof. An air motor 3 is supported in the fuselage and the shaft 4 thereof is provided with a clutch part 5 for engaging the part 2 for operatively connecting shaft 4 with the shaft 1, so that the shaft 1 of the propeller B will be driven from the air motor when the clutch parts are engaging.

A pair of tanks 6 is placed in the fuselage and are connnected by the pipes 7 with a pipe 8 which supplies air to the air motor to operate the same, and said pipe 8 contains a valve 9. The valve is operated by a lever 10 arranged adjacent the pilot's seat through means of the link 11 and a lever 12 has its lower end trough connected with the clutch part 5 and the other end of the lever is connected by a link 13 with a hand lever also located adjacent the pilot's seat.

The pipe leading from each tank is provided with a valve 14 and a gauge 15 is connected to the pipe 7 and the rear of each tank has a gauge 16 and a filling device 17 by which the air can be introduced into the tank.

From the foregoing it will be seen that if anything should happen to the gas motor E of the plane, the pilot by manipulating the hand levers will throw the clutch 5 into engagement with the clutch 2 so as to connect the shaft of the air motor with the shaft 1 and then by manipulating the valve, he can supply compressed air to the air motor to operate the same and thus the propeller will be driven by the air motor, and the plane can be landed safely even though the gas motor is not in operation.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In an aircraft including the fuselage, a propeller shaft rotatably supported in the front end of the fuselage and having one end extending beyond said front end, a propeller on said end, a motor connected to an intermediate part of the shaft, a clutch part connected to the rear end of the shaft, an air motor located in the front part of the fuselage and having a shaft extending forwardly, a clutch part on the forward end of the last mentioned shaft, a lever for moving the last mentioned part into and out of engagement with the first mentioned clutch part, a hand lever, means for connecting the same with the first mentioned lever, an air tank in the fuselage, pipes connecting the same with the air motor, a valve in one of said pipes, a second-hand lever and a link connecting the same with the valve.

In testimony whereof I affix my signature.

EDWARD CARLSON.